United States Patent [19]

van Ballegooijen et al.

[11] Patent Number: 5,336,737
[45] Date of Patent: Aug. 9, 1994

[54] PROCESS FOR THE PREPARATION OF RANDOM COPOLYMERS OF CONJUGATED DIENES AND VINYL AROMATIC COMPOUNDS

[75] Inventors: Hendrik van Ballegooijen, Amsterdam, Netherlands; Joseph P. M. Peters, Berre L'Etang, France; Johannes T. A. Plum, Gravenhage, Netherlands

[73] Assignee: Shell Oil Company, Houston, Tex.

[21] Appl. No.: 567,843

[22] Filed: Aug. 15, 1990

[30] Foreign Application Priority Data

Aug. 16, 1989 [GB] United Kingdom ............... 8918702

[51] Int. Cl.$^5$ ............... C08F 2/06; C08F 236/10
[52] U.S. Cl. ............................. 526/70; 526/67; 526/87; 526/89; 526/173; 526/340; 525/386
[58] Field of Search ............ 526/340, 173, 67, 70, 526/87, 89

[56] References Cited

U.S. PATENT DOCUMENTS

| | | | |
|---|---|---|---|
| 2,975,160 | 3/1961 | Zelinski | 260/83.7 |
| 3,294,768 | 12/1966 | Wofford | 260/83.7 |
| 3,953,543 | 4/1976 | Futamura et al. | 260/880 B |
| 4,061,848 | 12/1977 | Sistig et al. | 526/77 X |
| 4,121,031 | 10/1978 | Minekawa et al. | 526/340 X |

FOREIGN PATENT DOCUMENTS

| | | |
|---|---|---|
| 054911 | 6/1982 | European Pat. Off. . |
| 128607 | 12/1984 | European Pat. Off. . |
| 162483 | 11/1985 | European Pat. Off. . |
| 270178 | 6/1988 | European Pat. Off. . |
| 313164 | 4/1989 | European Pat. Off. . |
| 1066667 | 4/1967 | United Kingdom . |
| 1136189 | 12/1968 | United Kingdom . |
| 1222325 | 2/1971 | United Kingdom . |
| 1283327 | 7/1972 | United Kingdom . |
| 1396630 | 6/1975 | United Kingdom . |
| 1400497 | 7/1975 | United Kingdom . |
| 1466183 | 2/1977 | United Kingdom . |
| 2071117 | 9/1981 | United Kingdom . |
| 2075521A | 11/1981 | United Kingdom . |

*Primary Examiner*—Fred Teskin

[57] ABSTRACT

A process for the preparation of a random copolymer of at least one conjugated diene and at least one vinyl aromatic compound comprising reacting the monomers with the aid of an initiator based on lithium in the presence of an essentially inert solvent wherein said solvent consists of at least 60 per cent by weight of cyclopentane and the heat of reaction is withdrawn by means of reflux cooling.

15 Claims, No Drawings

PROCESS FOR THE PREPARATION OF RANDOM COPOLYMERS OF CONJUGATED DIENES AND VINYL AROMATIC COMPOUNDS

BACKGROUND

The invention relates to solution polymerization of conjugated dienes and vinyl aromatic compounds. The invention further relates to random copolymers of the conjugated dienes and vinyl aromatic compounds in which more than 60% of the monomer units are arranged in an arbitrary manner.

Many processes for the preparation of substantially random copolymers of conjugated dienes and vinyl aromatic compounds are well known in the art. Typically, the solvents described for the known polymerization processes include essentially any aliphatic, cycloaliphatic or aromatic compound or a mixture of these compounds, provided that the compound is essentially inert. Cyclohexane alone or in combination with another compound is a highly preferred solvent in prior art processes. Cyclopentane can be found among the compounds actually mentioned as suitable solvents although not exemplified.

An obvious reason for selection of cyclohexane is the well known dissolving ability of cyclohexane for the reaction components and the reaction products of polymerization processes of aromatic vinyl compounds and conjugated dienes. Furthermore the use of cyclohexane as solvent is an economical attractive choice because of its ready availability and its relatively low price.

The random copolymerization processes referred to above are suitably carried out at temperatures in the range of from 50° C. to 110° C. Often compounds having a lower boiling point than cyclohexane, i.e. lower than 80° C., are added to the cyclohexane containing polymerization medium, in such concentrations that the solvency power is still sufficient, in order to provide enough vapor pressure to be able to remove the heat of polymerization by means of evaporative cooling.

Isopentane and n-hexane are known to be suitable for lowering the boiling point of cyclohexane.

It is an object of the present invention to replace a major part of the cyclohexane component of the solvent used in prior art processes for the preparation of substantially random copolymers of conjugated dienes and vinyl aromatic compounds, by a more volatile component while maintaining sufficient solvency during all stages of the polymerization. This was thought to be attractive since it was assumed that this would lead to considerable savings in the steam coagulation of the cement, the solvent recovery and the polymer drying operation. Moreover if a lower boiling solvent were used as the sole solvent in the entire polymerization process further savings could be achieved in solvent storage handling and purification.

SUMMARY

A process for the preparation of a random copolymer of at least one conjugated diene and at least one vinyl aromatic compound comprising reacting the monomers with the aid of an initiator based on lithium in the presence of an essentially inert solvent wherein said solvent consists of at least 60 per cent by weight of cyclopentane and the heat of reaction is withdrawn by means of reflux cooling.

DETAILED DESCRIPTION OF THE INVENTION

As a result of extensive research and experimentation a process has now surprisingly been found in which the random polymerization of conjugated dienes and vinyl aromatic compounds is carried out in a solvent which consists of at least 60% by weight of cyclopentane and in which process the heat of reaction is withdrawn by means of reflux cooling.

When using cyclopentane as the major component by weight of the solvent in the process of the present invention, several additional advantageous aspects, apart from those already mentioned related to the use of a low boiling solvent, can be recognized.

In the process according to the present invention polymerization rate constants have been found to be significantly higher than in similar polymerization processes using n-hexane/cyclohexane mixtures as the solvent, which under similar conditions results in higher polymerization rates or alternatively results in a reduction of the monomer concentration in the reaction mixture.

This implies that at the end of the polymerization reaction purification of the resulting polymer is easier and thus more economical and environmentally benign.

The solvency power of solvents consisting of at least 60% by weight of cyclopentane was found to be at least as well as that of solvents consisting of at least 50% by weight of cyclohexane during all stages of the polymerization process.

Since the generally applied reaction temperature lies in the range up to 95° C. and since cyclopentane has a boiling point of 49° C., i.e. 32° C. lower than cyclohexane, polymerization processes carried out using a solvent according to the present invention can be easily cooled by means of reflux cooling only.

Since the polymerization process according to the present invention can be carried out at relatively low temperatures the danger of thermal decomposition of the living polymer chain end is lowered as well as the chance that when styrene is applied as the vinyl aromatic compound a high polymerization temperature causes the thermal homopolymerization of the monomer by free radicals.

Cyclopentane is readily available and can be obtained in industrial quantities from for instance naphtha streams by distillation after complete hydrogenation of the $C_5$ fraction, from distillation of refinery crude distiller $C_5$ streams or by hydrogenation of dicyclopentadiene.

The unexpectedness of the finding that cyclopentane is particularly suitable for use as a solvent in processes for the preparation of random copolymers of conjugated dienes and vinyl aromatic compounds is stressed by the fact that cyclopentane has been readily available for a respectable length of time.

Any other inert aliphatic, cycloaliphatic or aromatic compound being mixable with cyclopentane and not interfering with the solvency power may constitute the remaining 40 or less percentages of the solvent, aliphatic and/or cycloaliphatic and/or aromatic compounds containing 6 or less carbon atoms being preferred, isopentane being the most preferred.

In a preferred embodiment of the present invention the solvent consists of more than 80%, more preferably of more than 95%, by weight of cyclopentane.

The solvent according to the present invention can be used in virtually any solution polymerization process for the preparation of substantially random copolymers of conjugated dienes and vinyl aromatic compounds. By choosing a specific process applying specific reaction conditions substantially random copolymers having the desired specific characteristics can be produced.

Cyclopentane can be conveniently applied in known random polymerization processes. However, of all random polymerization processes, the one as disclosed in British patent specification No. 1,283,327, is particularly preferred. Therefore according to a preferred embodiment of the present invention random copolymers are prepared by batch copolymerization of a conjugated diene and a vinyl aromatic compound with the aid of an initiator based on lithium in the presence of a solvent consisting for at least 60% by weight of cyclopentane, in which embodiment (a) first a starting mixture is prepared from the solvent and part of the totally needed quantity of each of the monomers (b) subsequently the copolymerization is initiated by contacting this mixture with the initiator, and (c) during copolymerization the monomer ratio in the reaction mixture is kept constant (as hereinafter described) by addition of the remaining part of each of the monomers, while the heat of reaction is withdrawn by means of reflux cooling.

With the term "constant" as used throughout the specification is meant that the monomer weight ratio during the copolymerization is substantially balanced.

In step (b) as a rule the totally needed quantity of initator is added to the mixture mentioned under (a) under homogenization in a comparatively short time. Usually the moment at which step (c) is started approximately coincides with that at which the addition of initiator is stopped, but may be a little earlier or later.

The copolymerization reaction is preferably terminated by means of substances which kill the living polymer; this can be a proton releasing compound, for instance water, an alcohol, an amine or protonic acid, or, which is preferred, a coupling agent.

The coupling can be effected conveniently by use of a difunctional coupling agent, for example 1,2 dibromoethane, or a diisocyanate providing a linear coupled copolymer or a tri-, tetra-, or other polyfunctional coupling agent for example the tetra-functional compounds silicon tetrachloride, stannic chloride, dimethyladipate and diethyladipate providing a non-linear or branched coupled copolymer. Where the coupling is only partly complete for example at 50% of the theoretical amount, the product of the coupling reaction consists partly of coupled copolymer and partly of uncoupled copolymer.

The aromatic vinyl compound is preferably styrene, but may consist of another mono-vinyl aromatic compound for example: 1-vinylnaphthalene, 3,5-diethylstyrene, 4-n-propylstyrene, 2,4,6-trimethylstyrene, 4-phenylstyrene, 4-methylstyrene, 3,5-diphenylstyrene, 3-ethyl-1-vinylnaphthalene 8-phenyl-1-vinylnaphthalene or a mixture thereof or mixtures containing predominantly styrene.

The conjugated diene is one capable of copolymerization with styrene or another aromatic vinyl compound and such that when polymerized with styrene or another selected aromatic vinyl compound or compounds, it provides a polymer having the desired properties. The diene is preferably 1,3-butadiene, but may be another diene, for example, 1,3-pentadiene, 2-methyl-1,3-butadiene (isoprene), 2,3-dimethyl-1,3-butadiene, 2-methyl-1,3-pentadiene or 2,3-dimethyl-1,3-pentadiene or mixtures of them alone or with butadiene.

In the preferred process two different preselected monomer ratios are applied: the monomer ratio in the mixture prepared beforehand in which the copolymerization is initiated and that in which the monomers are supplied after the initiation of the copolymerization. The monomer supplementation can take place by addition either of the monomers as a mixture prepared beforehand or of each monomer separately. Also the addition can be carried out continuously or portionwise. As a result of the measures mentioned, during the polymerization the monomer ratio and the monomer concentration in the reactor is kept constant or substantially constant which facilitates the control of the process. It is recommended that less than 90% by weight of the totally needed quantity of the aromatic vinyl compound is used in the preparation of the starting mixture, the application of quantities smaller than 50% by weight of the totally needed quantity of the aromatic vinyl compound being particularly preferred.

Also special preference is given to the addition of the remaining part of each of the monomers during the copolymerization at a rate equal to the rate at which the concerning monomer is consumed. Here "equal" includes substantially equal. Fulfillment of this condition results in that in the reactor not only the monomer ratio but also the absolute quantity of each of the monomers remains constant or substantially constant. In this case the decrease of the monomer concentration does no exceed a value determined by the increase of the polymer concentration. Under these conditions the rate at which the monomers are applied during the copolymerization can be kept constant or substantially constant at a value calculated beforehand and the heat development also remains constant or substantially constant throughout the polymerization.

For obtaining a suitable polymerization rate there is no need to carry out the reaction at a high temperature, however the temperature should be sufficiently high to be able to withdraw the heat of the polymerization process by means of evaporative cooling. Therefore reaction temperatures up to 95° C. are preferred.

The preferred diene/aromatic vinyl compound weight ratio in the mixture in which the copolymerization reaction is initiated amounts to from 50:50 to 5:95.

Though in principle in the mixture in which the copolymerization is initiated any monomer concentration can be applied preferably a total amount of monomer of at least 0.05% by weight is used, total amounts of from 0.1 to 10.0% by weight being particularly recommended.

It is desirable that throughout the process the reaction mixture is intensively homogenized. As a rule the homogenization is brought about by means of an intensively working stirrer.

As an initiator based on lithium can for instance be applied: alkyllithium compounds, such as methylenedilithium, isopropyllithium, n-butyllithium, sec-butyllithium, amyllithium, 2-ethylhexyllithium, phenyllithium, ethylenedilithium trimethylenedilithium, pentamethylenedilithium, 1,4-dilithiobenzene, 1,5-dilithiobenzene, 1,5-dilithionaphthalene and 1,3,5-trilithiumpentane.

The amount of initiator used in the process according to the present invention may vary within wide limits. In general 0.001–1.0 g of metallic or bound lithium per 100 g of monomer is applied.

If required the copolymerization can be carried out in the presence of a slight amount of divinylbenzene or other substance that causes branching or cross-linking of the copolymer, prior to, together with or subsequent to the use of a coupling agent such as silicon tetrachloride, stannic chloride, a dihalogen hydrocarbon, a monoester such as ethylacetate, ethylacrylate or phenyl benzoate or a diester obtained by the reaction of a dicarboxylic acid with a monovalent alcohol, such as diethyladipate. In addition the process can be applied in combination with the use of polar organic compound for example as described in the British patent specification No. 884,490, which modifies the initiator in such a way that statistic copolymerization is promoted. In this way the microstructure of the diene part of the copolymer is changed to the effect that the 1,2-addition structure increases.

Generally at the end of the reaction the copolymer containing the reaction mixture is pumped to a polymer recovery area. The principal step in recovery of the polymer comprises coagulation and eventual drying of the polymer to produce a crumb. Thus the cement may be coagulated by treatment with steam and/or hot water. Alternatively the cement may be sprayed into a hot water bath under such condition that a crumb is formed. The solvent is removed as a vapour and may be recovered and recycled as desired. The resulting copolymer-water slurry is withdrawn and passed on to a dewatering screen where the water passes through the screen leaving the rubber crumb. This may be reslurried with cold water, drained and finally dried by known means.

The invention further provides an unvulcanized composition comprising a blend of a copolymer produced according to the process of the present invention with vulcanization compounding ingredients and articles which have been formed by vulcanizing such compositions.

Usual compounding ingredients are vulcanizing agents, vulcanization accelerating agents, vulcanization activating agents, antioxidants, fillers and extender oils which may be naphthenic, paraffinic or, which is preferred aromatic. The preferred vulcanizing agent is sulphur and the preferred filler is carbon black. Other examples of vulcanizing agents are 4,4'-dithiomorpholine and alkenyl phenoldisulphides. Examples of vulcanization activating agents which may be present are zinc oxide and stearic acid. Examples of vulcanization accelerating agents are cyclohexyl-2-benzothiazyl sulphenamide and 2-(4-morpholinyl-mercapto-)benzothiazole. The copolymer composition may further contain other inorganic fillers for example silica, bentonite, clay, titanium oxide, talc, diatomaceous earth, chalk and china clay.

The following examples and comparative examples are presented to further illustrate the invention, without intending to limit the scope thereof.

EXAMPLE 1

1,3-Butadiene and styrene were copolymerized by means of sec-butyllithium as the initiator with the use of a purified diluent, consisting of a mixture of 80 pbw of cyclopentane and 20 pbw of other aliphatics and cycloaliphatics containing 5 or 6 carbon atoms. The copolymerization was carried out in a reactor of 9 liters capacity, which was provided with an vigorous stirrer and which had been washed beforehand with the diluent, the air in the reactor having been displaced by dry oxygen free nitrogen. The reactor was filled with 5000 grams of the diluent mixture, 87.9 grams of styrene and 14.7 grams of butadiene. After the reactor charge had been heated to the required temperature (75° C.) while stirring intensively, the traces of initiator poison still present were rendered harmless by the slow addition of a small amount of sec-butyllithium solution to be used for the copolymerization till the start of an increase in temperature of the mixture could be observed. This initiator solution contained 200 mmol of sec-butyllithium per liter; the said small amount corresponds to 0.2 mmol of lithium compound. The aforementioned amount of initiator solution needed for the copolymerization (40 ml) was subsequently added, intensive stirring still being continued, as a result of which the copolymerization was initiated. Immediately after the addition of the stoichiometric amount of sec-butyllithium, both styrene and butadiene were supplied, each of them in a rate equal to their consumption, i.e. 1.00 gram of styrene and 3.18 gram of butadiene per minute. After 240 minutes the monomers supply was stopped and 2 mmol of diethyladipate was added to the reactor to terminate the polymerization as well as couple the copolymer molecules formed. During the whole process the stirring was still continued and the temperature was kept at the same level of 75° C. Twenty minutes after the addition of the diethyladipate, the polymer solution thus obtained was carried off from the reactor and the polymer was recovered by steam stripping and drying. Details of the experimental conditions, as well as data on the copolymer formed are presented in Table I.

EXAMPLES 2–4 AND COMPARATIVE EXAMPLES A AND B

Examples 2, 3 and 4 and comparative examples A and B were carried out in the same manner as example 1, with the exception of variations in the process as can be derived from tables II, III, IV, V and VI respectively, showing details of experimental conditions as well as the data on the copolymers formed.

TABLE I (Example 1)

| 1- Composition of the reactor charge at the moment when the polymerization was initiated: | |
|---|---|
| diluent (cyclopentane (80%)) | 5000 g |
| styrene | 87.9 g |
| butadiene | 14.7 g |
| sec-butyllithium | 8 mmol |
| 2- Polymerization conditions | |
| reaction temperature | 75° C. |
| rate of styrene supply | 1.0 g/min |
| rate of butadiene supply | 3.18 g/min |
| polymerization time | 240 min |
| 3- Coupling reaction | |
| diethyladipate (DEAP) | 2 mmol |
| coupling time | 20 min |
| 4- Copolymer formed | |
| Molecular weight (before coupling) | 215000[1] |
| Molecular weight (after coupling) | 720000 |
| Coupled portion of the copolymer | 77% |
| Content of copolymerized styrene (after coupling) | 23.8% w |
| Microstructure of the butadiene part of the copolymer cis-1,4 content | 34.7% w |
| trans-1,4 content | 55.3% w |
| 1,2 content | 10.0% w |

[1]Molecular weights were determined by GPC, calibrated with polystyrene samples of well-known molecular weights and narrow molecular weight distribution.

TABLE II (Example 2)

1- Composition of the reactor charge at the moment when the polymerization was initiated:

| | |
|---|---|
| diluent (cyclopentane (80%)) | 5000 g |
| styrene | 149.0 g |
| butadiene | 25.0 g |
| sec-butyllithium | 8 mmol |

2- Polymerization conditions

| | |
|---|---|
| reaction temperature | 75° C. |
| rate of styrene supply | 1.69 g/min |
| rate of butadiene supply | 5.36 g/min |
| polymerization time | 142 min |

3- Coupling reaction

| | |
|---|---|
| diethyladipate (DEAP) | 2 mmol |
| coupling time | 20 min |

4- Copolymer formed

| | |
|---|---|
| Molecular weight (before coupling) | 229000[1] |
| Molecular weight (after coupling) | 767000 |
| Coupled portion of the copolymer | 77% |
| Content of copolymerized styrene (after coupling) | 23.6% w |
| Microstructure of the butadiene part of the copolymer cis-1,4 content | 36.7% w |
| trans-1,4 content | 55.5% w |
| 1,2 content | 7.8% w |

[1] Molecular weights were determined by GPC, calibrated with polystyrene samples of well-known molecular weights and narrow molecular weight distribution.

TABLE III (Example 3)

1- Composition of the reactor charge at the moment when the polymerization was initiated:

| | |
|---|---|
| diluent (cyclopentane (80%)) | 5000 g |
| styrene | 26.7 g |
| butadiene | 4.4 g |
| sec-butyllithium | 8 mmol |

2- Polymerization conditions

| | |
|---|---|
| reaction temperature | 90° C. |
| rate of styrene supply | 1.0 g/min |
| rate of butadiene supply | 3.18 g/min |
| polymerization time | 240 min |

3- Coupling reaction

| | |
|---|---|
| diethyladipate (DEAP) | 2 mmol |
| coupling time | 20 min |

4- Copolymer formed

| | |
|---|---|
| Molecular weight (before coupling) | 235000[1] |
| Molecular weight (after coupling) | 748000 |
| Coupled portion of the copolymer | 70% |
| Content of copolymerized styrene (after coupling) | 24.9% w |
| Microstructure of the butadiene part of the copolymer cis-1,4 content | 34.3% w |
| trans-1,4 content | 56.6% w |
| 1,2 content | 9.1% w |

[1] Molecular weights were determined by GPC, calibrated with polystyrene samples of well-known molecular weights and narrow molecular weight distribution.

TABLE IV (Example 4)

1- Composition of the reactor charge at the moment when the polymerization was initiated:

| | |
|---|---|
| diluent (cyclopentane (80%)) | 5000 g |
| styrene | 58.5 g |
| butadiene | 9.7 g |
| sec-butyllithium | 8 mmol |

2- Polymerization conditions

| | |
|---|---|
| reaction temperature | 90° C. |
| rate of styrene supply | 2.19 g/min |
| rate of butadiene supply | 6.94 g/min |
| polymerization time | 110 min |

3- Coupling reaction

| | |
|---|---|
| diethyladipate (DEAP) | 2 mmol |
| coupling time | 20 min |

4- Copolymer formed

| | |
|---|---|
| Molecular weight (before coupling) | 218000[1] |
| Molecular weight (after coupling) | 730000 |
| Coupled portion of the copolymer | 71% |
| Content of copolymerized styrene (after coupling) | 23.5% w |
| Microstructure of the butadiene part of the copolymer cis-1,4 content | 36.0% w |
| trans-1,4 content | 56.8% w |
| 1,2 content | 7.2% w |

[1] Molecular weights were determined by GPC, calibrated with polystyrene samples of well-known molecular weights and narrow molecular weight distribution.

TABLE V (Comparative example A)

1- Composition of the reactor charge at the moment when the polymerization was initiated:

| | |
|---|---|
| diluent (cyclopentane/n-hexane 50/50 w/w) | 5000 g |
| styrene | 149.0 g |
| butadiene | 28.8 g |
| sec-butyllithium | 8 mmol |

2- Polymerization conditions

| | |
|---|---|
| reaction temperature | 75° C. |
| rate of styrene supply | 1.0 g/min |
| rate of butadiene supply | 3.18 g/min |
| polymerization time | 240 min |

3- Coupling reaction

| | |
|---|---|
| diethyladipate (DEAP) | 2 mmol |
| coupling time | 20 min |

4- Copolymer formed

| | |
|---|---|
| Molecular weight (before coupling) | 220000[1] |
| Molecular weight (after coupling) | 750000 |
| Coupled portion of the copolymer | 74% |
| Content of copolymerized styrene (after coupling) | 24.1% w |
| Microstructure of the butadiene part of the copolymer cis-1,4 content | 35.4% w |
| trans-1,4 content | 55.4% w |
| 1,2 content | 9.2% w |

[1] Molecular weights were determined by GPC, calibrated with polystyrene samples of well-known molecular weights and narrow molecular weight distribution.

TABLE VI (Comparative example B)

1- Composition of the reactor charge at the moment when the polymerization was initiated:

| | |
|---|---|
| diluent (cyclopentane/n-hexane 50/50 w/w) | 5000 g |
| styrene | 58.5 g |
| butadiene | 11.2 g |
| sec-butyllithium | 8 mmol |

2- Polymerization conditions

| | |
|---|---|
| reaction temperature | 90° C. |
| rate of styrene supply | 1.0 g/min |
| rate of butadiene supply | 3.18 g/min |
| polymerization time | 240 min |

3- Coupling reaction

| | |
|---|---|
| diethyladipate (DEAP) | 2 mmol |
| coupling time | 20 min |

4- Copolymer formed

| | |
|---|---|
| Molecular weight (before coupling) | 227000[1] |
| Molecular weight (after coupling) | 775000 |
| Coupled portion of the copolymer | 72% |
| Content of copolymerized styrene (after coupling) | 24.3% w |
| Microstructure of the butadiene part of the copolymer cis-1,4 content | 35.0% w |
| trans-1,4 content | 55.1% w |
| 1,2 content | 9.9% w |

[1] Molecular weights were determined by GPC, calibrated with polystyrene samples of well-known molecular weights and narrow molecular weight distribution.

We claim:

1. An improved process for the preparation of a random copolymer of at least one conjugated diene and at least one vinyl aromatic compound wherein the monomers are reacted with the aid of an initiator based on lithium in the presence of an essentially inert solvent, the improvement comprising reacting the monomers in a solvent comprising at least 60 percent by weight of cyclopentane and withdrawing the heat of reaction by reflux cooling.

2. The process of claim 1 wherein the solvent comprises at least 80 per cent by weight of cyclopentane.

3. The process of claim I wherein the solvent comprises at least 95 per cent by weight of cyclopentane.

4. The process of claim 1 wherein the solvent consists of one or more compounds which are selected from the group consisting of aliphatic, cycloaliphatic, and aromatic compounds and contain 6 or less carbon atoms.

5. The process of claim 4 wherein the solvent consists of cyclopentane and isopentane.

6. The process of claim 1 wherein the copolymerization is carried out at a temperature of up to 95° C.

7. A process for the preparation of a random copolymer of at least one conjugated diene and at least one vinyl aromatic comprising the steps of:
preparing a starting mixture of a conjugated diene monomer and a vinyl aromatic monomer in an essentially inert solvent, the solvent comprising at least 60 percent by weight of cyclopentane;
contacting the initial mixture with a reaction initiator based on lithium;
withdrawing the heat of reaction by reflux cooling;
adding amounts of each of the monomers to maintain a constant ratio of the conjugated diene monomer to the vinyl aromatic monomer; and
recovering a random copolymer from the inert solvent.

8. The process of claim 7 wherein the starting mixture contains less than 90 per cent by weight of the total quantity of the vinyl aromatic monomer used prior to recovery of the random polymer.

9. The process of claim 7 wherein the starting mixture contains less than 50 per cent by weight of the total quantity of the vinyl aromatic monomer used prior to recovery of the random copolymer.

10. The process of claim 7 wherein the constant ratio of the monomers is maintained by continuous addition of each of the monomers at rates about equal to consumption of the monomers.

11. The process of claim 7 wherein the reflux cooling maintains a constant polymerization temperature.

12. The process of claim 7 wherein the starting mixture contains the monomers in a weight ratio of conjugated diene to vinyl aromatic of from 50:50 to 5:95.

13. The process of claim 7 wherein the conjugated diene monomer consists of 1,3-butadiene and the vinyl aromatic monomer consists of styrene.

14. The process of claim 13 wherein the total amount of 1,3-butadiene and styrene in the starting mixture amounts to at least 0.05 per cent by weight of the starting mixture.

15. The process of claim 10 wherein the copolymerization reaction is discontinued as soon as the addition of monomers is discontinued.

* * * * *